June 29, 1943.   J. H. JACKSON   2,323,045
SLIDING TRAY FOR AUTOMOBILE COMPARTMENTS
Filed Nov. 22, 1941   2 Sheets-Sheet 1

Inventor
James Henry Jackson
By Clarence A. O'Brien
Attorney

June 29, 1943. J. H. JACKSON 2,323,045
SLIDING TRAY FOR AUTOMOBILE COMPARTMENTS
Filed Nov. 22, 1941 2 Sheets-Sheet 2

Inventor
James Henry Jackson

By *Clarence A. O'Brien*

Attorney

Patented June 29, 1943

2,323,045

UNITED STATES PATENT OFFICE 2,323,045

SLIDING TRAY FOR AUTOMOBILE COMPARTMENTS

James Henry Jackson, South Norfolk, Va.

Application November 22, 1941, Serial No. 420,144

1 Claim. (Cl. 45—77)

The present invention relates to new and useful improvements in automobile compartments mounted in the instrument panel of the automobile and has for its primary object to provide a sliding tray construction adapted for movement into and out of position in the compartment.

A further object is to provide a sliding tray construction of this character which is simple and practical, neat and attractive in appearance, relatively inexpensive to manufacture and install in position in a conventional type of automobile compartment, and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
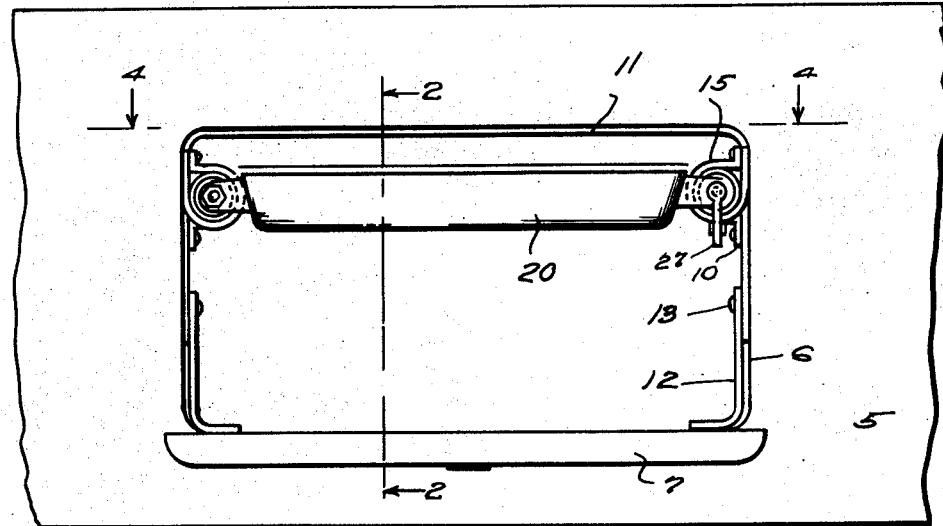
Figure 1 is a front elevational view with the door of the compartment open.
Figure 2:
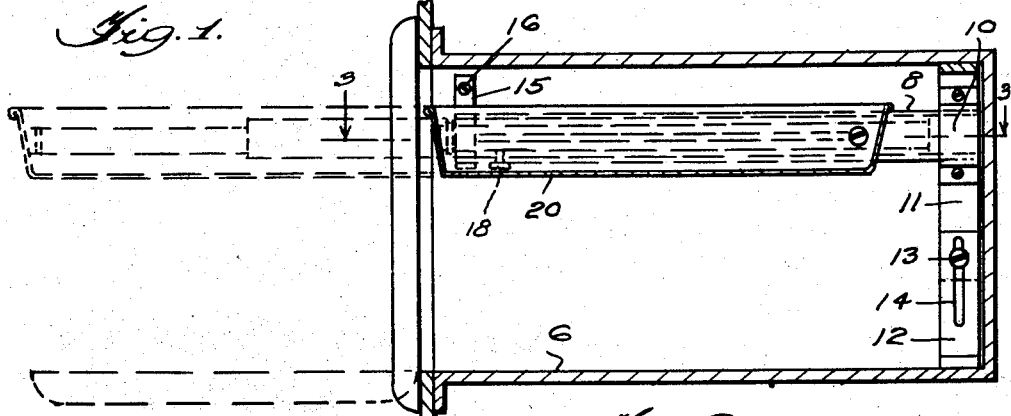
Figure 2 is a vertical longitudinal sectional view taken substantially on a line 2—2 of Figure 1.
Figure 3:
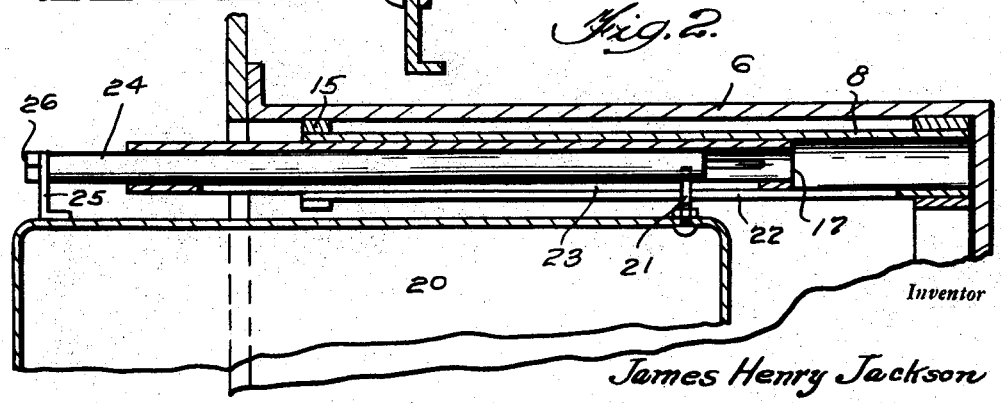
Figure 3 is a fragmentary sectional view through one of the telescoping supports for the tray.
Figure 4:
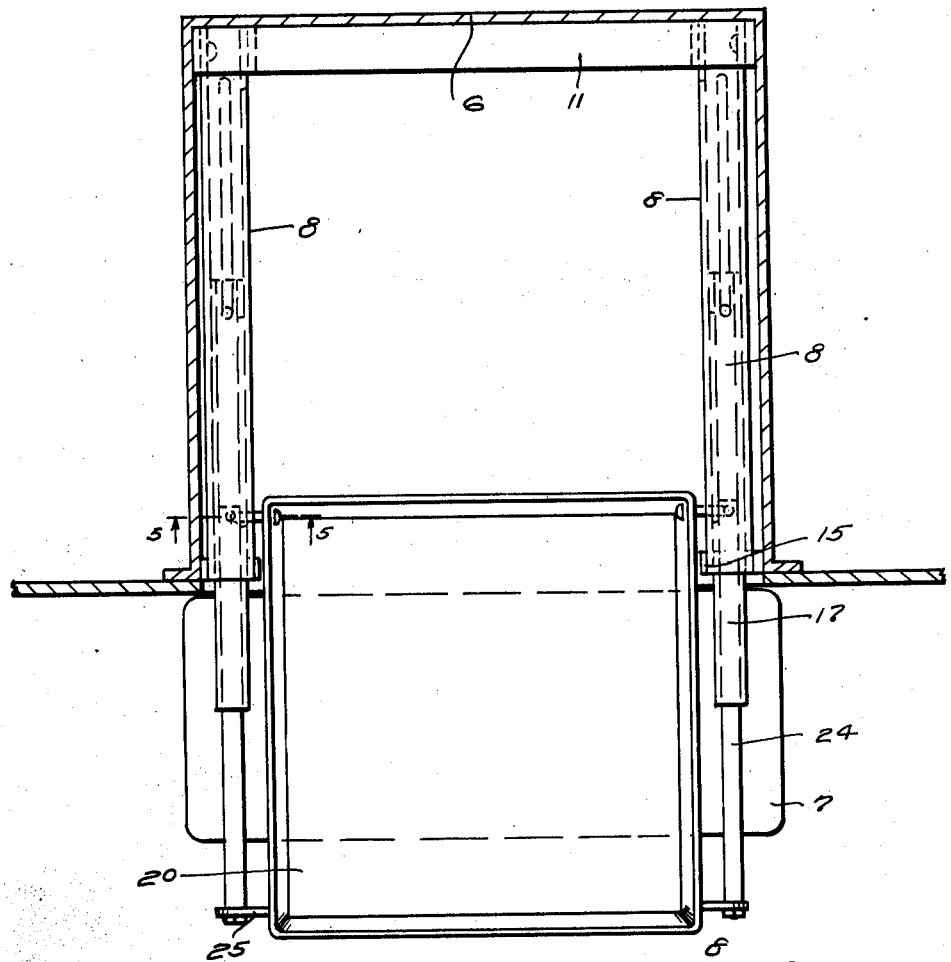
Figure 4 is a horizontal sectional view taken substantially on a line 4—4 of Figure 1.
Figure 5:
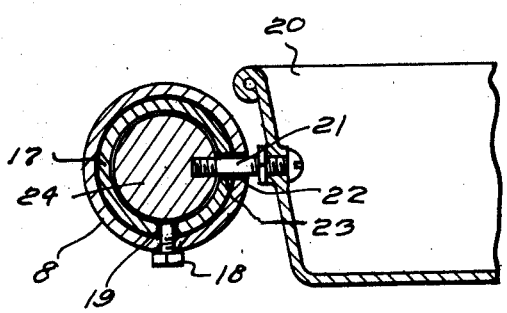
Figure 5 is a fragmentary sectional view through one of the telescoping tray supports taken substantially on a line 5—5 of Figure 2.
Figure 6:
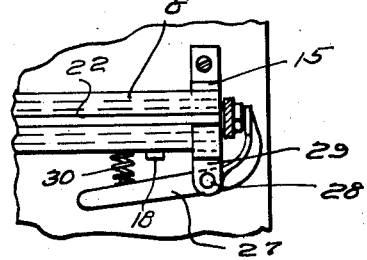
Figure 6 is a detail of the lock catch.

Referring now to the drawings in detail, the numeral 5 designates the instrument panel of an automobile in which the conventional compartment 6 is mounted having the hinged door 7 at the front thereof.

A pair of tubular guides 8 are positioned horizontally along the upper side walls of the compartment, the rear ends of the tubes being supported by means of clamping brackets 10 secured to the inner sides of an inverted U-shaped member 11 which is supported at its lower ends by legs 12, the member 11 being adjustable as to height by a screw 13 carried by the member and inserted in a slot 14 in the leg. The front ends of the guides 8 are supported by hangers 15 secured to the side walls of the compartment by rivets or bolts 16.

The guide members 8 have their front ends open for slidably receiving a sleeve 17, in each guide, the bottom of the guide 8 having a headed bolt 18 projecting therethrough slidably mounted in a slot 19 formed in the underside of the sleeve 17, the ends of the slot terminating short of the ends of the sleeve to limit the outward movement of the sleeve 17.

A shallow tray 20 is provided with bolts 21 projecting outwardly from each side adjacent its rear end, the bolts being slidably mounted in aligned slots 22 and 23 respectively in the guide and sleeve, and threaded into rods 24 slidably mounted in the sleeves. Brackets 25 project laterally from the sides of the tray adjacent its front end and are secured to the front ends of the rods 24 by nuts 26 threaded on the reduced outer ends of the rods.

From the foregoing it will be apparent that the rods carrying the tray 20 are adapted for sliding movement into and out of position in the sleeves 17 and the sleeves likewise are adapted for telescoping movement in the tubular guides 8 so that the tray may be moved completely within the compartment 6 or may be extended outwardly therefrom into a convenient position as a support for articles that might be desired to be placed in the tray.

In order to secure the tray against accidental outward sliding movement, I provide a catch 27 pivoted as at 28 to a bracket 29 on the underside of the front end of one of the guides 8, one end of the catch extending upwardly and terminating in the path of the outer end of the rod 24. The other end of the catch is engaged by a coil spring 30 for yieldably urging the catch in engagement with the rod, said spring actuated end of the catch being movable by the fingers of a person for releasing the catch.

It is believed the details of construction, operation and advantages of the device will be readily understood from the foregoing without further detailed explanation.

Having thus described the invention what I claim is:

A tray support comprising a plurality of telescoping members arranged in parallelism at opposite sides of the tray, fixed tubular guides for said members, means attaching the tray to the members for sliding movement therewith, hangers for supporting the front ends of said guides, a U-shaped bracket including leg portions having means for extending said leg portions and adapted for bracing the bracket against opposite internal walls of a compartment in which the bracket is placed, and means for securing the rear ends of said guides to said bracket.

JAMES HENRY JACKSON.